(12) United States Patent
Cha et al.

(10) Patent No.: US 12,388,920 B2
(45) Date of Patent: Aug. 12, 2025

(54) ELECTRONIC DEVICE, IMAGE PROCESSING SYSTEM, AND OPERATING METHOD OF THE ELECTRONIC DEVICE

(71) Applicant: Samsung Electronics Co., Ltd., Suwon-si (KR)

(72) Inventors: Sungho Cha, Anyang-si (KR); Kaeul Lee, Cheonan-si (KR); Minhyuk Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 17/939,288

(22) Filed: Sep. 7, 2022

(65) Prior Publication Data

US 2023/0074382 A1    Mar. 9, 2023

(30) Foreign Application Priority Data

Sep. 8, 2021    (KR) .................. 10-2021-0119858

(51) Int. Cl.
*H04M 1/02*    (2006.01)

(52) U.S. Cl.
CPC ....... *H04M 1/0268* (2013.01); *H04M 1/0264* (2013.01)

(58) Field of Classification Search
CPC .... H04M 1/0268; H04M 1/0264; H04N 9/77; H04N 5/232; G09G 5/02
See application file for complete search history.

(56) References Cited

U.S. PATENT DOCUMENTS

| | | | |
|---|---|---|---|
| 10,997,893 B1 | 5/2021 | Lee et al. | |
| 2020/0035195 A1* | 1/2020 | Maeng | G09G 5/02 |
| 2020/0265803 A1* | 8/2020 | Lee | G06F 3/041 |
| 2020/0326900 A1* | 10/2020 | Kwon | G06F 3/0482 |
| 2021/0125538 A1* | 4/2021 | Lee | H04N 9/44 |
| 2022/0046215 A1 | 2/2022 | Cha et al. | |

FOREIGN PATENT DOCUMENTS

| | | |
|---|---|---|
| CN | 111598944 A | 8/2020 |
| KR | 10-2019-0000765 A | 1/2019 |
| KR | 10-2019-0102152 A | 9/2019 |
| KR | 10-2020-0078024 A | 7/2020 |
| KR | 10-2022-0017649 A | 2/2022 |
| WO | WO-2021/071301 A1 | 4/2021 |
| WO | WO-2021/206511 A1 | 10/2021 |
| WO | WO-2022/092652 A1 | 5/2022 |

* cited by examiner

Primary Examiner — John J Lee
(74) Attorney, Agent, or Firm — Harness, Dickey & Pierce, P.L.C.

(57) ABSTRACT

An electronic device, a image processing system, and an operating method of an electronic device are disclosed. The electronic device includes a display device including a flexible display panel; a first image sensor configured to, when the flexible display panel is bent, sense an adjustment image displayed on the flexible display panel and generate adjustment image data of the adjustment image; a second image sensor configured to sense external light; and a processor configured to generate, based on the adjustment image data and reference image data, an adjustment value for setting the flexible display panel.

18 Claims, 11 Drawing Sheets

ELECTRONIC DEVICE, IMAGE PROCESSING SYSTEM, AND OPERATING METHOD OF THE ELECTRONIC DEVICE

CROSS-REFERENCE TO RELATED APPLICATION

This application is based on and claims priority under 35 U.S.C. § 119 to Korean Patent Application No. 10-2021-0119858, filed on Sep. 8, 2021, in the Korean Intellectual Property Office, the entire disclosure of which is incorporated, herein, by reference.

BACKGROUND

1. Field

At least some example embodiments of the inventive concepts relate to an electronic device, and more particularly, to an electronic device capable of performing a display calibration operation and an operating method of the electronic device.

2. Related Art

Electronic devices, such as portable computers, media players, portable phones, and set-top boxes, include displays for displaying visual information. Displays with a large screen, thin thickness, small weight, and high performance have been developed to display various and many pieces of visual information. In order to implement portable electronic devices having a large display, flexible displays are required. Electronic devices visually provide various screens by using a flexible display.

When a display is used for a long time, degradation in image quality may occur, and display calibration is needed for optimizing the display. In a case where a user manually adjusts display calibration, the user has difficulties in performing display calibration or precisely optimizing a display. In a case where separate sensors are included in electronic devices so as to automatically perform display calibration, a problem where a total size of each electronic device increases may occur.

SUMMARY

According to at least some example embodiments of the inventive concepts provide an electronic device and an operating method thereof, the electronic device being capable of sensing an image displayed on a flexible display when a flexible display panel is bent, and generating an adjustment value for setting the flexible display panel on the basis of the sensed image, thereby performing an adjustment to optimize or, alternatively, improve the flexible display panel.

According to at least some example embodiments, an electronic device includes a display device including a flexible display panel; a first image sensor configured to, when the flexible display panel is bent, sense an adjustment image displayed on the flexible display panel and generate adjustment image data of the adjustment image; a second image sensor configured to sense external light; and a processor configured to generate, based on the adjustment image data and reference image data, an adjustment value for setting the flexible display panel.

According to at least some example embodiments of the inventive concepts, an image processing system includes a first image sensor configured to, sense an adjustment image displayed on a flexible display panel, and generate adjustment image data of the adjustment image; a second image sensor configured to sense external light; and an image processor configured to, output a first control signal for performing a calibration operation of the flexible display panel based on light sensed by each of the first image sensor and the second image sensor, and generate an adjustment value for setting the flexible display panel based on the adjustment image data and reference image data.

According to at least some example embodiments of the inventive concepts, an operating method of an electronic device includes determining whether first image data less than or equal to a set value is received from a first image sensor during a first period of time; determining whether second image data less than or equal to a set value is received from a second image sensor during a second period of time; generating a first control signal based on whether the first image data is received and the second image data is received; transferring the first control signal and sample image data to a flexible display panel; obtaining, based on the first control signal and the sample image data, adjustment image data corresponding to an adjustment image displayed by the flexible display panel; and generating, based on the adjustment image data and reference adjustment data, an adjustment value for setting the flexible display panel.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION OF THE EMBODIMENTS

Figure 1:
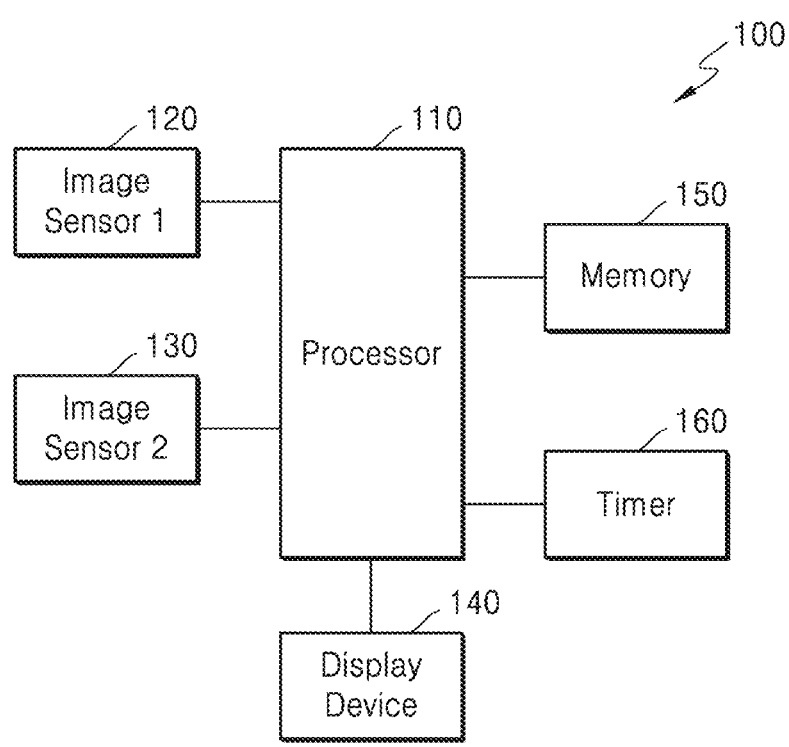
FIG. 1 is a block diagram for describing an electronic device according to at least one example embodiment of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Figure 2A:
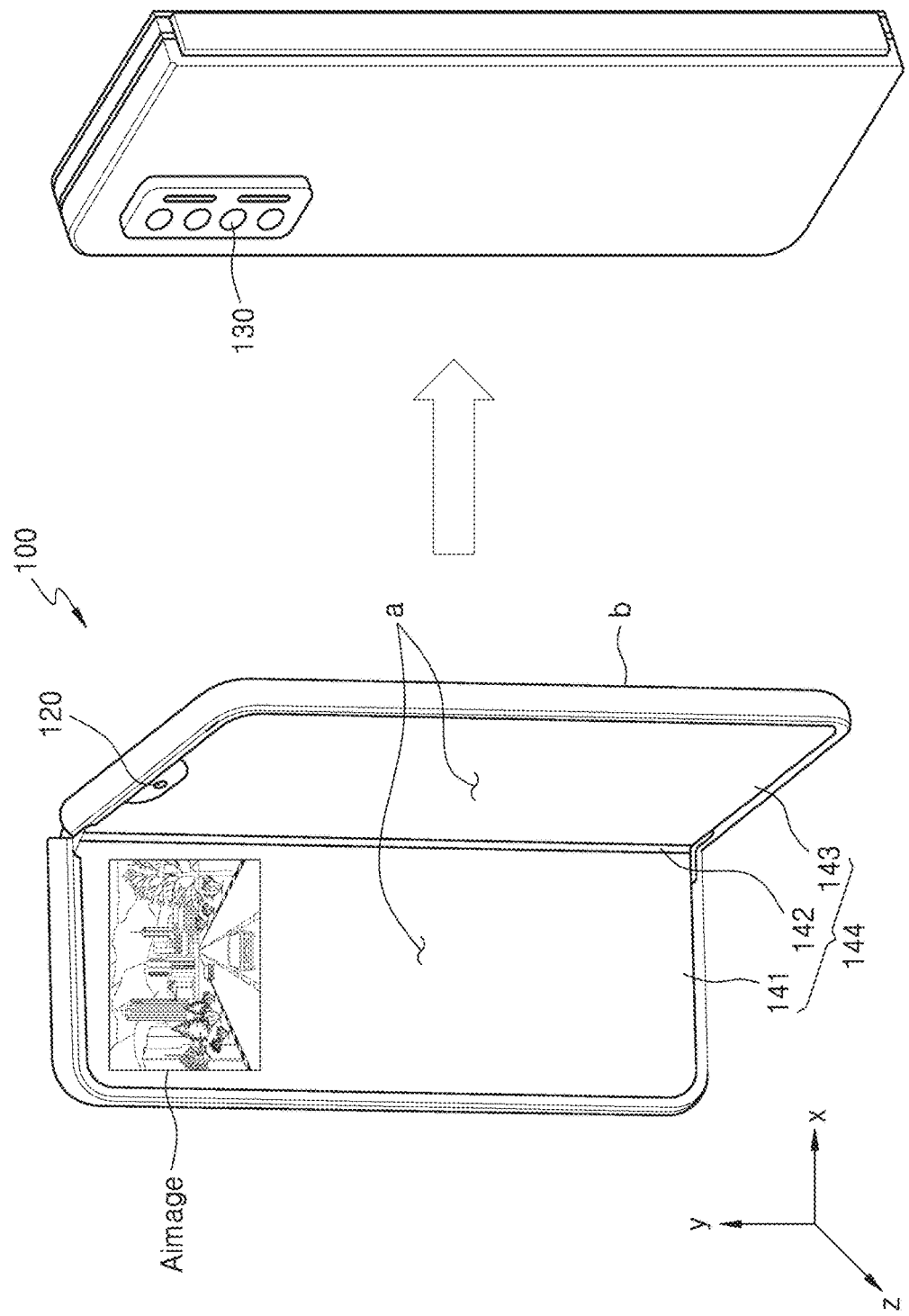
FIGS. 2A and 2B are diagrams for describing an operation of an electronic device according to at least one example embodiment of the inventive concepts.
Figure 2B:
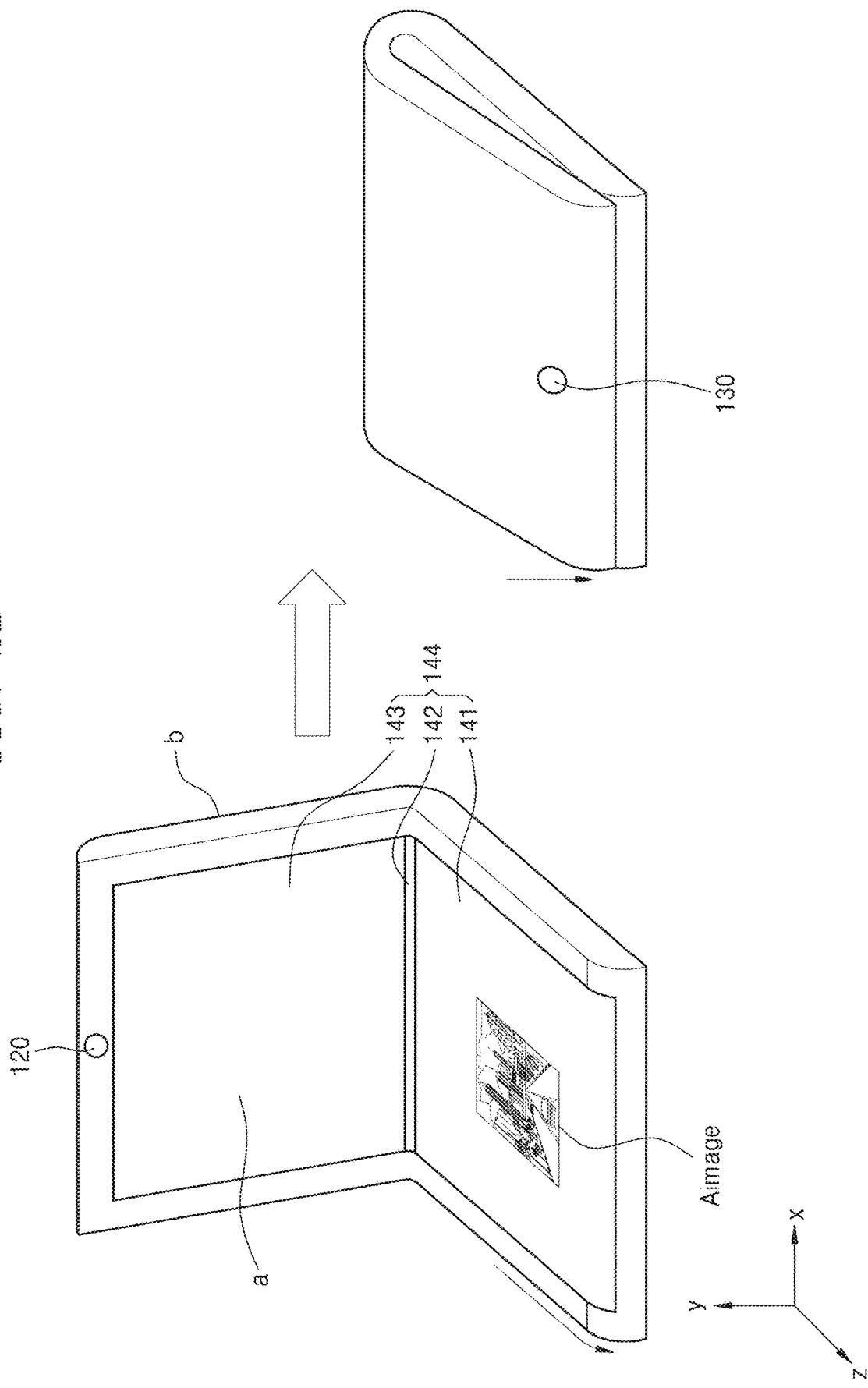

FIG. 1 is a block diagram for describing an electronic device 100 according to at least one example embodiment of the inventive concepts. FIGS. 2A and 2B are diagrams for describing an operation of an electronic device according to at least one example embodiment of the inventive concepts.

Referring to FIG. 1, the electronic device 100 may include a processor 110, a first image sensor 120, a second image sensor 130, a display device 140, a memory 150, and a timer 160. According to at least one example embodiment of the inventive concepts, the electronic device 100 may further include general-use elements other than the elements illustrated in FIG. 1. According to at least some example embodiments of the inventive concepts, the electronic device 100 and/or elements thereof, may be, or include, processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc.

The electronic device 100 may include at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, and a wearable device. In addition, the electronic device 100 may include a smart home appliance. The smart home appliance may include, for example, at least one of a television (TV), a digital video disk (DVD) player, an audio, a refrigerator, an air conditioner, a vacuum cleaner, an oven, a microwave oven, a washing machine, an air cleaner, a set-top box, a home automation control panel, a security control panel, a TV box, a game console, an electronic dictionary, an electronic key, a camcorder, and an electronic picture frame. Also, the electronic device 100 may include various medical devices. The medical devices may include, for example, various portable medical measurement devices (for example, blood glucose monitoring devices, heart rate measurement devices, blood pressure measurement devices, body temperature measurement devices, or the like), a magnetic resonance angiography (MRA) device, a magnetic resonance imaging (MRI) device, a computed tomography (CT) device, a scanning machine, or an ultrasonic device.

The processor 110 may control an overall operation of the electronic device 100. The processor 110 may include one or more of a central processing unit (CPU), an application processor (AP), and a communication processor (CP). The processor 110 may execute, for example, the control of at least one other element of the electronic device 100 and/or an arithmetic operation on communication or data processing.

The display device 140 may denote a means which adjusts an attribute of a screen provided to a user to display the screen. The attribute of the screen may denote at least one of luminance, saturation, and a color. The display device 140 may include a display panel. The display panel may be a display unit which displays a real image and may be one of display devices, which receive an electrically transferred image signal to display a two-dimensional (2D) image, such as a thin film transistor-liquid crystal display (TFT-LCD), an organic light emitting diode (OLED) display, a field emission display, and a plasma display panel (PDP). The display panel may be implemented as another type of flat display or flexible display panel.

The first image sensor 120 may detect light incident on the first image sensor 120 and may generate image data. The first image sensor 120 may convert an optical signal of an object incident through an optical lens into an electrical signal and may generate the image data on the basis of the electrical signal.

The first image sensor 120 may detect light incident from a periphery of the first image sensor 120. The first image sensor 120 may be disposed on the same surface as a flexible display panel included in the display device 140. When the flexible display panel is bent (e.g., while the flexible display panel is in a bent state) and turned off, the light from the periphery of the first image sensor 120 may not be incident on the first image sensor 120.

The second image sensor 130 may detect light incident on the second image sensor 130 and may generate image data. The second image sensor 130 may convert an optical signal of an object incident through an optical lens into an electrical signal and may generate the image data on the basis of the electrical signal. The second image sensor 130 may sense external light outside the electronic device 100. Hereinafter, positions of the first image sensor 120, the second image sensor 130, and the flexible display panel will be described in detail with reference to FIGS. 2A and 2B.

Referring to FIG. 2A, an electronic device 100 may include a first image sensor 120, a second image sensor 130, and a flexible display panel 144. Repeated descriptions of the above descriptions are omitted.

The flexible display panel 144 may be disposed on a first surface a of the electronic device 100, and the first image sensor 120 may be disposed on the first surface a of the electronic device 100. The second image sensor 130 may be disposed on a second surface b of the electronic device 100. The first surface a and the second surface b may denote opposite surfaces. The first surface a may be referred to as a front surface of the electronic device 100, and the second surface b may be referred to as a rear surface of the electronic device 100. When the flexible display panel 144 is bent (e.g., while the flexible display panel 144 is in a bent state), the first image sensor 120 may not be seen from the outside of the electronic device 100.

The flexible display panel 144 may include a first region 141, a bending region 142, and a second region 143. The first region 141 may be connected to the second region 143 through the bending region 142. The first region 141, the bending region 142, and the second region 143 may include a plurality of subpixels and may display an image through the plurality of subpixels. The bending region 142 may denote a region where the flexible display panel 144 is bent. The flexible display panel 144 may be bent with respect to a y direction. With respect to the y direction, the first region 141 and the second region 143 may overlap to face each other.

The first image sensor 120 may be disposed on the same surface as the second region 143. When the flexible display panel 144 is bent (e.g., while the flexible display panel 144 is in a bent state), the first image sensor 120 may overlap to face the first region 141. When the flexible display panel 144 is bent (e.g., while the flexible display panel 144 is in a bent state), the first image sensor 120 may sense light of the first region 141. However, at least some example embodiments of the inventive concepts are not limited thereto, and the first image sensor 120 may be disposed on the same surface as the first region 141. When the flexible display panel 144 is bent (e.g., while the flexible display panel 144 is in a bent state), the first image sensor 120 may sense light of the first region 141.

Referring to FIG. 2B, a flexible display panel 144 may include a first region 141, a bending region 142, and a second region 143. The electronic device 100, the flexible display panel 144, the first image sensor 120, and the second image sensor 130 of FIG. 2A may be the same as those of FIG. 2B, and thus, repeated descriptions are omitted. The first region 141, the bending region 142, and the second region 143 may include a plurality of subpixels and may display an image through the plurality of subpixels. The bending region 142 may denote a region where the flexible display panel 144 is bent. The flexible display panel 144 may be bent with respect to an x direction. With respect to the z direction, the first region 141 and the second region 143 may overlap to face each other. Referring to FIGS. 1, 2A, and 2B, the display device 140 may be implemented so that, when the flexible display panel 144 is bent (e.g., while the flexible display panel 144 is in a bent state), the flexible display panel 144 does not display an image for a predetermined or, alternatively, desired time. When the flexible display panel 144 included in the display device 140 is bent (e.g., while the flexible display panel 144 is in a bent state), there may not be light incident on the first image sensor 120 for a certain time, and thus, the first image sensor 120 may not detect light. For example, when the flexible display panel 144 is bent (e.g., while the flexible display panel 144 is in a bent state), there may not be an image displayed on the first region 141, and thus, the first image sensor 120 may not detect light. When the flexible display panel 144 is bent (e.g., while the flexible display panel 144 is in a bent state), the first image sensor 120 may not be affected by light incident from the outside. The first image sensor 120 may output first image data including information representing that light is hardly detected by the first image sensor 120, and the first image data may be transferred to the processor 110.

The second image sensor 130 may detect external light outside the electronic device 100. The second image sensor 130 may output second image data including information about the amount of external light outside the electronic device 100. The second image data may be transferred to the processor 110.

The processor 110 may generate a first control signal on the basis of light sensed by each of the first image sensor 120 and the second image sensor 130. The first control signal may denote a control signal for performing a calibration operation on a display panel included in the display device 140.

The processor 110 may receive the first image data having a set value or less from the first image sensor 120 for a first time. The term "first time" as used in the present specification refers to a period of time (e.g., a first period of time or a first time period). The processor 110 may determine whether light is not incident on the first image sensor 120 during the first time, on the basis of receiving the first image data having the set value or less. The first time may denote a time (e.g., a period of time) which is previously set in the processor 110. According to at least some example embodiments of the inventive concepts, when the flexible display panel 144 is bent (e.g., while the flexible display panel 144 is in a bent state), the flexible display panel 144 may not display an image during a predetermined or, alternatively, desired time. There is hardly light incident on the first image sensor 120, and thus, when the first image sensor 120 does not detect light during the first time, the processor 110 may determine that the flexible display panel 144 is bent and a calibration operation of the flexible display panel 144 is ready to perform. The set value may be a value obtained by acquiring the R, G, and B colors of the display panel as an image. The set value may be a reference value for determining whether light necessary to generate image data is sufficiently irradiated. The first image data less than or equal to the set value or the second image data equal to or less than the set value may mean image data that cannot be displayed by acquiring R, G, and B colors of the display panel as an image.

The processor 110 may receive the second image data having a set value or less from the second image sensor 130 during a second time. The term "second time" as used in the present specification refers to a period of time (e.g., a second period of time or a second time period). The processor 110 may determine whether light is not incident on the second image sensor 130 during the second time, on the basis of receiving the second image data having the set value or less. The second time may denote a time (e.g., a period of time) which is previously set in the processor 110. The second time may be the same as or different from the first time.

When the processor 110 receives the first image data having the set value or less during the first time and receives the second image data having the set value or less during the second time, the processor 110 may generate the first control signal. When light is not incident on the first image sensor 120 during the first time and light is not incident on the second image sensor 130 during the second time, the processor 110 may generate the first control signal. The first control signal may be transferred to the display device 140. That is, when the flexible display panel 144 is bent (e.g., while the flexible display panel 144 is in a bent state) and does not display an image and there is no external light outside the electronic device 100, the processor 110 may generate the first control signal.

The processor 110 may transfer the first control signal and sample image data to the display device 140. The sample image data may denote image data for the flexible display panel 144 displaying an adjustment image Aimage so as to perform a calibration operation of the flexible display panel 144. For example, the sample image data may be stored in the memory 150.

The display device 140 may control the flexible display panel 144 to display the adjustment image Aimage, on the basis of the first control signal and the sample image data. In detail, when a display driving circuit included in the display device 140 receives the first control signal, the display driving circuit may control the flexible display panel 144 to display the adjustment image Aimage, on the basis of the sample image data.

The first image sensor 120 may sense the adjustment image Aimage displayed on the flexible display panel 144. The first image sensor 120 may generate adjustment image data of the adjustment image Aimage. For example, when the flexible display panel 144 is bent (e.g., while the flexible display panel 144 is in a bent state), the first image sensor 120 may sense the adjustment image Aimage displayed on the first region 141 and may generate the adjustment image data. The adjustment image data may be transferred to the processor 110.

The processor 110 may generate an adjustment value on the basis of the adjustment image data and reference image data. The processor 110 may compare the adjustment image data with the reference image data and may generate an adjustment value corresponding to a comparison result obtained by comparing the adjustment image data with the reference image data. In this case, the adjustment value may denote a value for setting the flexible display panel 144.

The display device 140 may calibrate a color of the flexible display panel 144 on the basis of the adjustment value. The display device 140 may adjust the color of the flexible display panel 144 in order to optimize or, alternatively, improve the color of the flexible display panel 144 on the basis of the adjustment value.

The memory 150 may be a storage for storing data, and for example, may store various image processing algorithms, various programs, and various data. The memory 150 may store reference image data. The memory 150 may include at least one of a volatile memory and a non-volatile memory. The non-volatile memory may include read only memory (ROM), programmable ROM (PROM), electrically programmable ROM (EPROM), electrically erasable and programmable ROM (EEPROM), flash memory, phase-change random access memory (RAM) (PRAM), magnetic RAM (MRAM), resistive RAM (RRAM), and ferroelectric RAM (FRAM). The volatile memory may include dynamic RAM (DRAM), static RAM (SRAM), synchronous DRAM (SDRAM), phase-change RAM (PRAM), magnetic RAM (MRAM), resistive RAM (RRAM), and ferroelectric RAM (FeRAM). Also, according to at least one example embodiment of the inventive concepts, the memory 150 may include at least one of a hard disk drive (HDD), a solid-state drive (SSD), a compact flash (CF), a secure digital (SD) card, a micro secure digital (Micro-SD) card, a mini secure digital (Mini-SD) card, an extreme digital (xD) card, and a memory stick. According to at least one example embodiment of the inventive concepts, the memory 150 may semi-permanently or temporarily store algorithms, programs, and a plurality of instructions, which are executed by the processor 110.

The electronic device 100 may include the timer 160. The timer 160 may measure a time after the first control signal is generated. The processor 110 may again generate the first control signal on the basis of the time measured by the timer 160. In detail, when the time measured by the timer 160 is a predetermined or, alternatively, desired time, the processor 110 may determine whether to generate the first control signal and may re-generate the first control signal. For example, when the predetermined or, alternatively, desired time is assumed to be 24 hours, the processor 110 may determine that the time measured by the timer 160 is 24 hours and light of the flexible display panel 144 may not be incident on the first image sensor 120, and when light is not incident on the second image sensor 130 from the outside, the processor 110 may re-generate the first control signal. As another example, when the predetermined or, alternatively, desired time is assumed to be 7 days, the processor 110 may determine that the time measured by the timer 160 is 7 days and the light of the flexible display panel 144 may not be incident on the first image sensor 120, and when light is not incident on the second image sensor 130 from the outside of the electronic device 100, the processor 110 may re-generate the first control signal. The timer 160 may be reset whenever the first control signal is generated. A calibration operation of the flexible display panel 144 may be performed based on the first control signal. The electronic device 100 may include the timer 160, and thus, the calibration operation of the flexible display panel 144 may be automatically performed at every predetermined or, alternatively, desired time. For example, according to at least some example embodiments of the inventive concepts, the calibration operation of the flexible display panel 144 may be automatically and iteratively performed at a predetermined or, alternatively, desired time interval.

The electronic device 100 may include a user interface (not shown). The user interface may be implemented with various devices, such as a keyboard, a curtain key panel, a touch panel, a fingerprint sensor, and a microphone, for receiving a user input. The user interface may receive the user input and may provide the processor 110 with a signal corresponding to the received user input.

Figure 3:
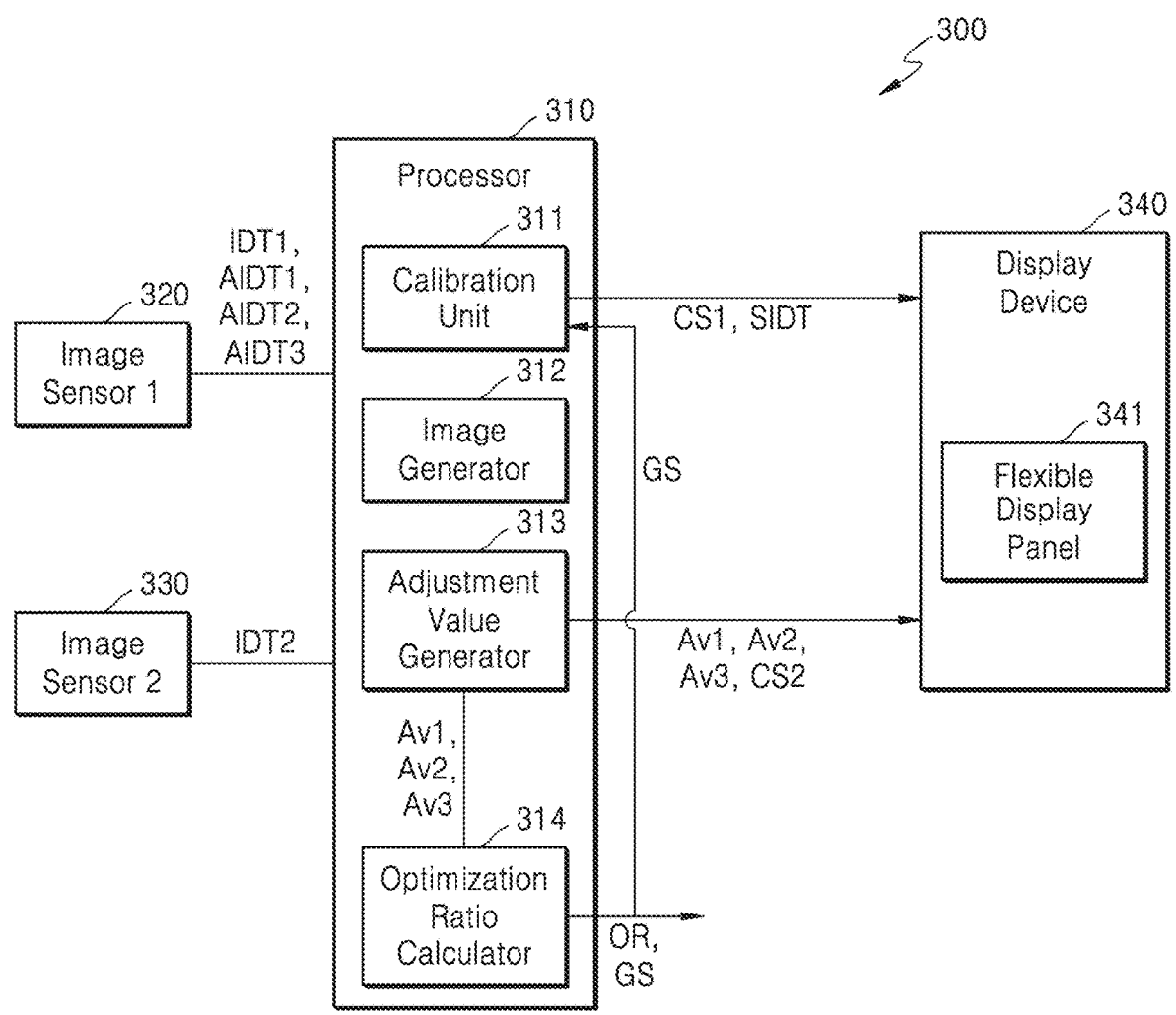
FIG. 3 is a block diagram for describing an electronic device according to at least one example embodiment of the inventive concepts.

FIG. 3 is a block diagram for describing an electronic device 300 according to at least one example embodiment of the inventive concepts.

Referring to FIG. 3, the electronic device 300 may include a processor 310, a first image sensor 320, a second image sensor 330, and a display device 340. The electronic device 300, the processor 310, the first image sensor 320, the second image sensor 330, and the display device 340 of FIG. 3 may be the same as the electronic device 100, the processor 110, the first image sensor 120, the second image sensor 130, and the display device 140 of FIG. 1, and thus, repeated descriptions are omitted. For example, according to at least some example embodiments, the first image sensor 320, the second image sensor 330, and the processor 310 of FIG. 3 are examples of the first image sensor 120, the second image sensor 130, and the processor 110 of FIG. 1.

The first image sensor 320 may output first image data IDT1. The first image data IDT1 may include information representing that there is hardly the amount of light received by each of a plurality of pixels. When the flexible display panel 341 is bent (e.g., while the flexible display panel 144 is in a bent state), the flexible display panel 341 may not emit light for a predetermined or, alternatively, desired time and the first image sensor 320 may output the first image data IDT1. The first image data IDT1 may include a reset signal and an image signal. A voltage difference between the reset signal and the image signal may include information about the amount of light received by each of the plurality of pixels. The first image data IDT1 may be transferred to the processor 310.

The second image sensor 330 may output second image data IDT2. The second image data IDT2 may include information representing that there is hardly the amount of light received by each of the plurality of pixels. When light is not incident on the second image sensor 330 from the outside of the electronic device 300, the second image sensor 330 may output and transfer the second image data IDT2 to the processor 310.

The processor 310 may include a calibration unit 311, an image generator 312, an adjustment value generator 313, and an optimization ratio calculator 314. Each of the calibration unit 311, the image generator 312, the adjustment value generator 313, and the optimization ratio calculator 314 may be implemented with hardware, software, or a combination of hardware and software.

The calibration unit 311 may generate a first control signal CS1 on the basis of light sensed by each of the first image sensor 120 and the second image sensor 130. The calibration unit 311 may generate the first control signal CS1 on the basis of the first image data IDT1 and the second image data IDT2.

The calibration unit 311 may detect light of the flexible display panel 341 on the basis of the first image data IDT1. When the flexible display panel 341 is bent (e.g., while the flexible display panel 144 is in a bent state), the flexible display panel 341 may not display an image, and the first image sensor 320 may sense the flexible display panel 341 which does not display an image. Light may not be incident on the first image sensor 320 from the flexible display panel 341, and the first image sensor 320 may sense that the light is not incident thereon and may output the first image data IDT1. The calibration unit 311 may generate the first control signal CS1 on the basis of receiving the first image data IDT1 from the first image sensor 320 during a first time. The first time may denote a time which is previously set in the processor 310 so as to generate the first control signal CS1. The calibration unit 311 may receive the first image data IDT1 having a set value or less from the first image sensor 320 during the first time.

The calibration unit 311 may generate the first control signal CS1 on the basis of receiving the second image data IDT2 from the second image sensor 330 during a second time. The calibration unit 311 may receive the second image data IDT2 from the second image sensor 330 during the second time.

When the calibration unit 311 receives the first image data IDT1 having a set value or less from the first image sensor 320 during the first time and receives the second image data IDT2 having a set value or less from the second image sensor 330 during the second time, the calibration unit 311 may generate the first control signal CS1. The calibration unit 311 may transfer the first control signal CS1 and sample image data SIDT to the display device 340.

The image generator 312 may convert image data generated from the first image sensor 320. The image generator 312 may convert each of the first to third adjustment image data AIDT1 to AIDT3 and may generate first to third conversion image data corresponding to each of the first to third adjustment image data AIDT1 to AIDT3. The image generator 312 may convert the image data generated from the first image sensor 320 by using at least one of a color temperature having a predetermined or, alternatively, desired value and luminance having a predetermined or, alternatively, desired value. The image generator 312 may generate conversion image data without performing auto white balance on the image data. The auto white balance may denote a function of automatically correcting a distorted color on the basis a unique wavelength of source light. The image generator 312 may not automatically correct a color of the image data and may convert the image data as-is.

The image generator 312 may not perform a high dynamic range (HDR) function on the image data. The image generator 312 may convert the image data by using the luminance having the predetermined or, alternatively, desired value. The HDR may denote technology which enhances a dynamic range of an image to improve image quality. The dynamic range may denote a range capable of including luminance up to a bright portion of an image from a dark portion of the image. The image generator 312 may not perform the HDR function on the image data and may generate the conversion image data by using the luminance having the predetermined or, alternatively, desired value.

The image generator 312 may convert the image data on the basis of a gain of 1× so as to secure accuracy. The gain may denote a value for amplifying the image data. As the gain increases, the luminance of an image may increase.

The display device 340 may control the flexible display panel 341 to display an adjustment image on the basis of the first control signal CS1 and the sample image data SIDT. Hereinafter, a method of displaying an adjustment image by using the flexible display panel 341 will be described in detail with reference to FIGS. 4 and 5.

The adjustment value generator 313 may generate first to third adjustment values Av1 to Av3 on the basis of the first to third adjustment image data AIDT1 to AIDT3 and reference image data. The adjustment value generator 313 will be described below in detail with reference to FIGS. 4 and 5.

The optimization ratio calculator 314 may calculate an adjustment ratio such as, for example, an optimization ratio OR. The optimization ratio OR may be one example of an adjustment ratio. The optimization ratio calculator 314 may calculate the adjustment ratio or optimization ratio OR on the basis of the first adjustment value Av1, the second adjustment value Av2, and the third adjustment value Av3. The adjustment ratio or optimization ratio OR may represent whether a color of the flexible display panel 341 is optimized or, alternatively, improved.

The optimization ratio calculator 314 may control the calibration unit 311 to again generate the first control signal CS1 on the basis of the adjustment ratio or optimization ratio OR. When the adjustment ratio or optimization ratio OR is less than or equal to a predetermined or, alternatively, desired value, the optimization ratio calculator 314 may output a generating signal GS for determining whether again to generate the first control signal CS1. The generating signal GS may be transferred to the calibration unit 311.

When the calibration unit 311 receives the generating signal GS, the calibration unit 311 may again generate the first control signal CS1 on the basis of light sensed by each of the first image sensor 320 and the second image sensor 330.

The electronic device 300 according to at least one example embodiment of the inventive concepts may automatically perform a display calibration operation by using the first image sensor 320 and the second image sensor 330, thereby decreasing the cost.

Figure 4:
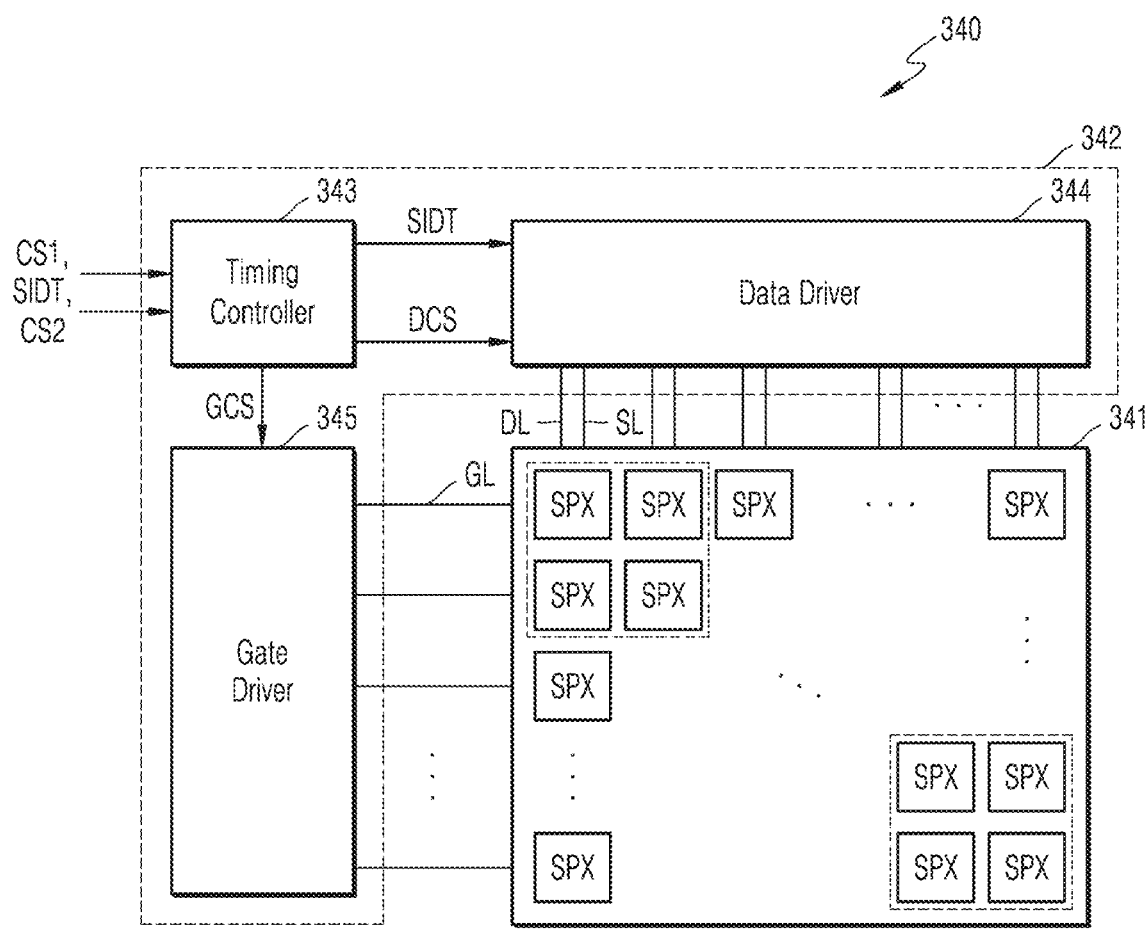
FIG. 4 is a diagram for describing a display device according to at least one example embodiment of the inventive concepts.

FIG. 4 is a diagram for describing a display device 340 according to at least one example embodiment of the inventive concepts.

Referring to FIG. 4, the display device 340 may include a display driving circuit 342 and a flexible display panel 341, and the display driving circuit 342 may include a timing controller 343, a data driver 344, and a gate driver 345. According to at least one example embodiment of the inventive concepts, the display driving circuit 342 and the flexible display panel 341 may be implemented as one module. For example, the display driving circuit 342 may be mounted on a circuit film such as a tape carrier package (TCP), a chip on film (COF), or a flexible printed circuit (FPC) and may be attached on the flexible display panel 341 on the basis of a tape automatic bonding (TAB) type or may be mounted on a non-display area of the flexible display panel 341 on the basis of a chip on glass (COG) type.

The flexible display panel 341 may include a plurality of signal lines (for example, a plurality of gate lines GL, a plurality of data lines DL, and a plurality of sensing lines SL) and may include a plurality of subpixels SPX (for example, a pixel array) which are connected to the plurality of signal lines and are arranged in a matrix form.

The plurality of subpixels SPX may display one of red, green, and blue, and a subpixel displaying red, a subpixel displaying green, and a subpixel displaying blue may be sequentially and repeatedly arranged. According to at least one example embodiment of the inventive concepts, subpixels displaying red, green, and blue may each be referred to as a red subpixel, a green subpixel, and a blue subpixel.

The gate driver 345 may drive the plurality of gate lines GL of the flexible display panel 341 by using a gate driver control signal GCS (for example, a gate timing control signal) received from the timing controller 343. The gate driver 345 may provide pulses having a gate-on voltage (for example, a scan voltage or a sensing-on voltage) to a corresponding gate line GL in a corresponding driving period of each of the plurality of gate lines GL on the basis of the gate driver control signal GCS.

The data driver 344 may drive the plurality of subpixels SPX through the plurality of data lines DL and may sense an electrical characteristic of the plurality of subpixels SPX through the sensing line SL.

The data driver 344 may digital-analog convert the sample image data SIDT received from the timing controller 343 and may provide driving signals, which are converted analog signals, to the flexible display panel 341 through the plurality of data lines DL. The driving signals may be respectively provided to the plurality of subpixels SPX, and thus, the flexible display panel 341 may display an adjustment image.

The timing controller 343 may control an overall operation of the display device 340. The timing controller 343 may control driving of the data driver 344 and the gate driver 345 on the basis of the firs control signal CS1 and the second control signal CS2 each received from a processor (for example, the processor 310 of FIG. 3). The timing controller 343 may be implemented with hardware, software, or a combination of hardware and software, and for example, the timing controller 343 may be implemented with digital logic circuits and registers, which perform below-described functions.

The timing controller 343 may provide a data driver control signal DCS to the data driver 344 and may control an operation and an operation time of the data driver 344 in response to the data driver control signal DCS.

Also, the timing controller 343 may provide the gate driver control signal GCS to the gate driver 345. As described above, the gate driver 345 may drive the plurality of gate lines GL of the flexible display panel 341 in response to the gate driver control signal GCS.

The timing controller 343 may perform various image processing on the sample image data SIDT received from the processor, so as to convert a format of the sample image data SIDT and decreasing power consumption. The timing controller 343 may transfer the sample image data SIDT to the data driver 344. The timing controller 343 may adjust a timing at which each of the red subpixel, the green subpixel, and the blue subpixel is turned on or off.

The flexible display device 340 may display an adjustment image corresponding to each subpixel having the same color among the plurality of subpixels on the basis of the first control signal CS1 and the sample image data SIDT. For example, the flexible display device 340 may display an adjustment image corresponding to the red subpixel on the basis of the sample image data SIDT by using the flexible display panel 341. The flexible display device 340 may display an adjustment image corresponding to the blue subpixel on the basis of the sample image data SIDT. The flexible display device 340 may display an adjustment image corresponding to the green subpixel on the basis of the sample image data SIDT. The data driver 344 may drive the red subpixel through the plurality of data lines DL, and thus, an adjustment image may be displayed on the flexible display panel 341.

Figure 5:
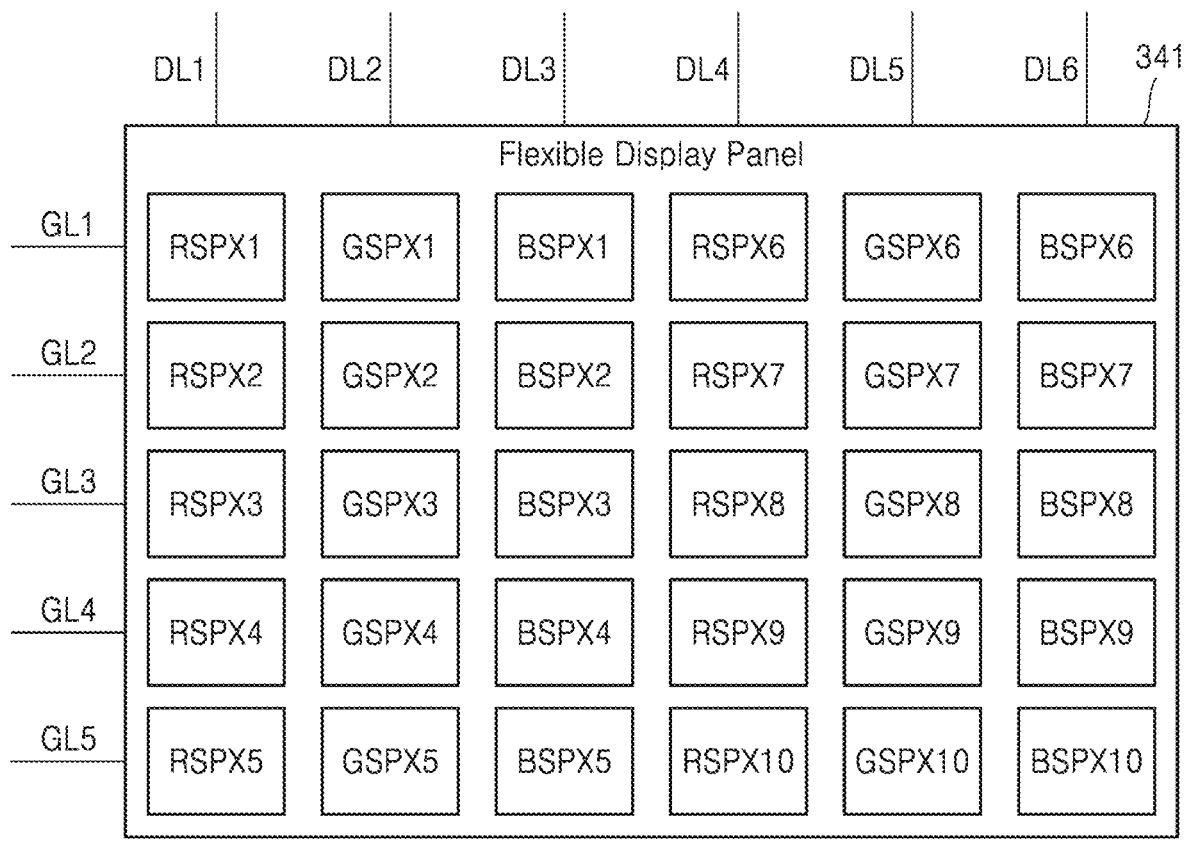
FIG. 5 is a diagram for describing an image displayed by a flexible display panel according to at least one example embodiment of the inventive concepts.

FIG. 5 is a diagram for describing an image displayed by a flexible display panel 341 according to at least one example embodiment of the inventive concepts. FIG. 5 illustrates description associated with FIG. 4, and thus, description which is the same as or similar to the above description is omitted. Hereinafter, FIGS. 4 and 5 are referred to together.

The flexible display panel 341 may include a plurality of subpixels. The flexible display panel 341 may include first to tenth red subpixels RSPX1 to RSPX10, first to tenth green subpixels GSPX1 to GSPX10, and first to tenth blue subpixels BSPX1 to BSPX10.

The data driver 344 may drive the first to tenth red subpixels RSPX1 to RSPX10 through the first data line DL1 and the fourth data line DL4. The data driver 344 may vary a level of a driving voltage which drives the first to tenth red subpixels RSPX1 to RSPX10. The flexible display panel 341 may display a first adjustment image by using the first to tenth red subpixels RSPX1 to RSPX10 on the basis of the sample image data SIDT.

The data driver 344 may drive the first to tenth green subpixels GSPX1 to GSPX10 through the second data line DL2 and the fifth data line DL5. The data driver 344 may vary a level of a driving voltage which drives the first to tenth green subpixels GSPX1 to GSPX10. The flexible display panel 341 may display a second adjustment image by using the first to tenth green subpixels GSPX1 to GSPX10 on the basis of the sample image data SIDT.

The data driver 344 may drive the first to tenth blue subpixels BSPX1 to BSPX10 through the third data line DL3 and the sixth data line DL6. The data driver 344 may vary a level of a driving voltage which drives the first to tenth blue subpixels BSPX1 to BSPX10. The flexible display panel 341 may display a third adjustment image by using the first to tenth blue subpixels BSPX1 to BSPX10 on the basis of the sample image data SIDT.

Hereinafter, FIGS. 3 to 5 are referred to together. The first image sensor 320 may sense a first adjustment image displayed by the flexible display panel 341 and may generate the first adjustment image data AIDT1 corresponding to the first adjustment image. The first image sensor 320 may sense a second adjustment image displayed by the flexible display panel 341 and may generate the second adjustment image data AIDT2 corresponding to the second adjustment image. The first image sensor 320 may sense a third adjustment image displayed by the flexible display panel 341 and may generate the third adjustment image data AIDT3 corresponding to the third adjustment image. The first adjustment image data AIDT1, the second adjustment image data AIDT2, and the third adjustment image data AIDT3 may be transferred to the processor 310. The first adjustment image data AIDT1, the second adjustment image data AIDT2, and the third adjustment image data AIDT3 may be transferred to the adjustment value generator 313. The adjustment image data may include the first adjustment image data AIDT1, the second adjustment image data AIDT2, and the third adjustment image data AIDT3.

The adjustment value generator 313 may generate the first to third adjustment values Av1 to Av3 on the basis of the first to third adjustment image data AIDT1 to AIDT3 and the reference image data. The adjustment value generator 313 may compare the first adjustment image data AIDT1 with first reference image data corresponding to the first adjustment image data AIDT1 and may generate the first adjustment value Av1 corresponding to a comparison result. According to at least one example embodiment of the inventive concepts, the adjustment value generator 313 may calculate the first adjustment value Av1 by using a mapping table. The mapping table may be stored in a memory (for example, the memory 150 of FIG. 1) of the electronic device 300. For example, the adjustment value generator 313 may extract a comparison result obtained by comparing the first adjustment image data AIDT1 with the first reference image data and may extract, as the first adjustment value Av1, a value corresponding to the comparison result in the mapping table.

The adjustment value generator 313 may compare the second adjustment image data AIDT2 with second reference image data corresponding to the second adjustment image data AIDT2 and may generate the second adjustment value Av2 corresponding to a comparison result. For example, the adjustment value generator 313 may extract a comparison result obtained by comparing the second adjustment image data AIDT2 with the second reference image data and may extract, as the second adjustment value Av2, a value corresponding to the comparison result in the mapping table.

The adjustment value generator 313 may compare the third adjustment image data AIDT3 with third reference image data corresponding to the third adjustment image data AIDT3 and may generate the third adjustment value Av3 corresponding to a comparison result. For example, the adjustment value generator 313 may extract a comparison result obtained by comparing the third adjustment image data AIDT3 with the third reference image data and may extract, as the third adjustment value Av3, a value corresponding to the comparison result in the mapping table.

The adjustment value generator 313 may generate a second control signal CS2 on the basis of the first adjustment value Av1, the second adjustment value Av2, and the third adjustment value Av3. The second control signal CS2 may denote a control signal for adjusting a color of the flexible display panel 144 for optimizing or, alternatively, improving the color of the flexible display panel 341 on the basis of the first adjustment value Av1, the second adjustment value Av2, and the third adjustment value Av3. The first adjustment value Av1, the second adjustment value Av2, the third adjustment value Av3, and the second control signal CS2 may be transferred to the display device 340.

The display device 340 may adjust a color of the flexible display panel 144 in order to optimize or, alternatively, improve the color of the flexible display panel 341 on the basis of the first adjustment value Av1, the second adjustment value Av2, and the third adjustment value Av3. The timing controller 343 may control the data driver 344 to vary a driving voltage which drives the flexible display panel 341, on the basis of the second control signal CS2.

Figure 6:
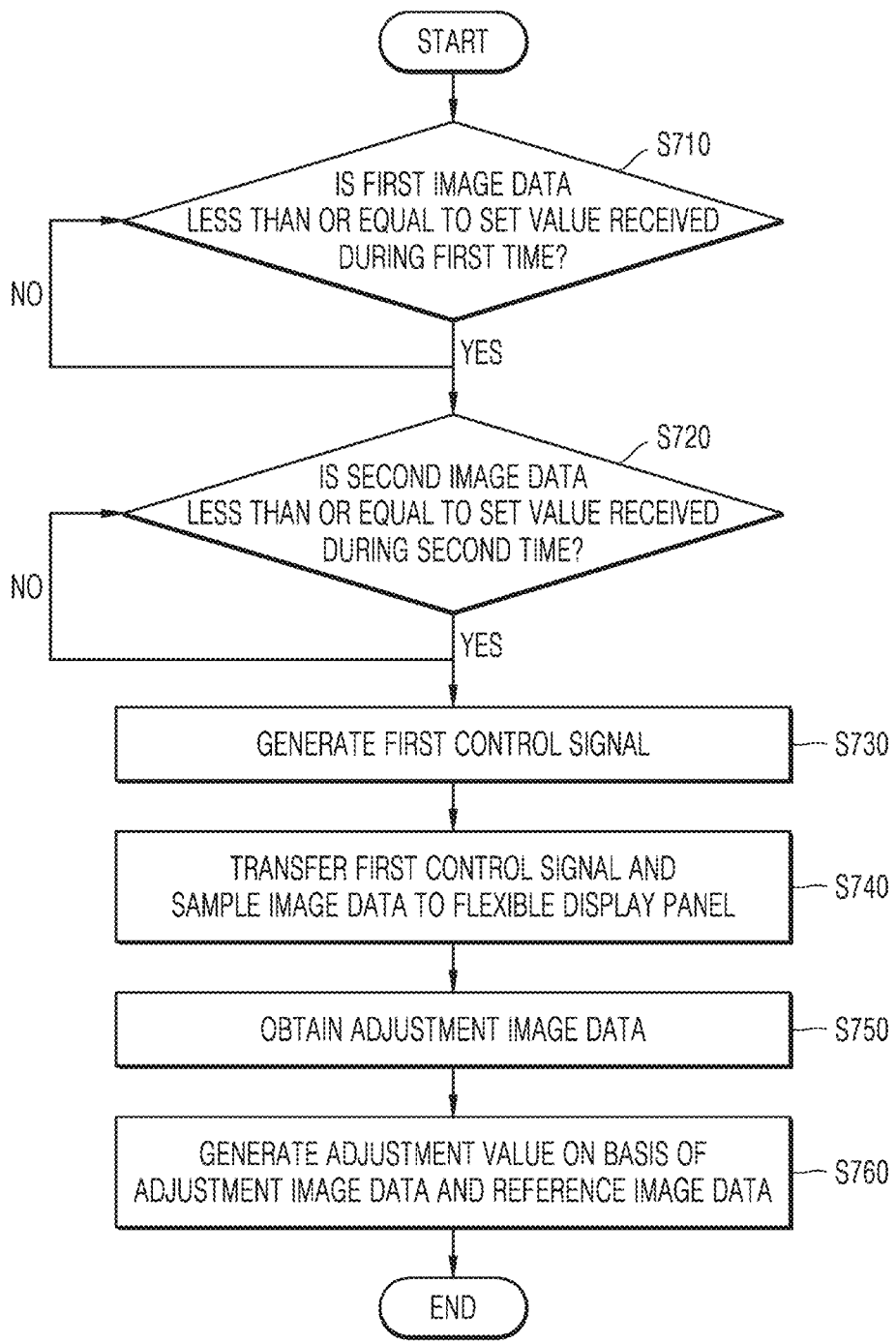
FIG. 6 is a flowchart for describing an operating method of an electronic device according to at least one example embodiment of the inventive concepts.

FIG. 6 is a flowchart for describing an operating method of an electronic device according to at least one example embodiment of the inventive concepts. In detail, FIG. 6 illustrates an operating method of an electronic device (for example, a processor (for example, the processor 310 of FIG. 3) of the electronic device 300 of FIG. 3).

In operation S710, the processor may determine whether first image data having a set value or less is received from a first image sensor during a first time. The processor may determine whether to generate a first control signal, on the basis of light sensed by the first image sensor. When the first image data having the set value or less is received during the first time (Yes, S710), the processor may determine whether the first image data having the set value or less is received during a second time (S720). When the first image data having the set value or less is not received during the first time (No, S710), the processor may re-perform operation S710.

In operation S720, the processor may determine whether second image data having a set value or less is received from a second image sensor during a second time. The processor may determine whether to generate the first control signal, on the basis of light sensed by the second image sensor. When the second image data having the set value or less is received during the second time (Yes, S720), the processor may generate the first control signal (S730). When the second image data having the set value or less is not received during the second time (No, S720), the processor may re-perform operation S720.

In operation S740, the processor may transfer the first control signal and sample image data to a flexible display panel. The flexible display panel may receive the sample image data and may display an adjustment image based on the sample image data. The flexible display device may display an adjustment image corresponding to each subpixel having the same color among a plurality of subpixels on the basis of the first control signal and the sample image data. The first image sensor may sense an adjustment image and may generate adjustment image data corresponding to the adjustment image.

In operation S750, the processor may obtain the adjustment image data from the first image sensor.

In operation S760, the processor may generate an adjustment value on the basis of the adjustment image data and reference image data. The processor may compare the adjustment image data with the reference image data and may generate the adjustment value corresponding to a comparison result.

Figure 7:
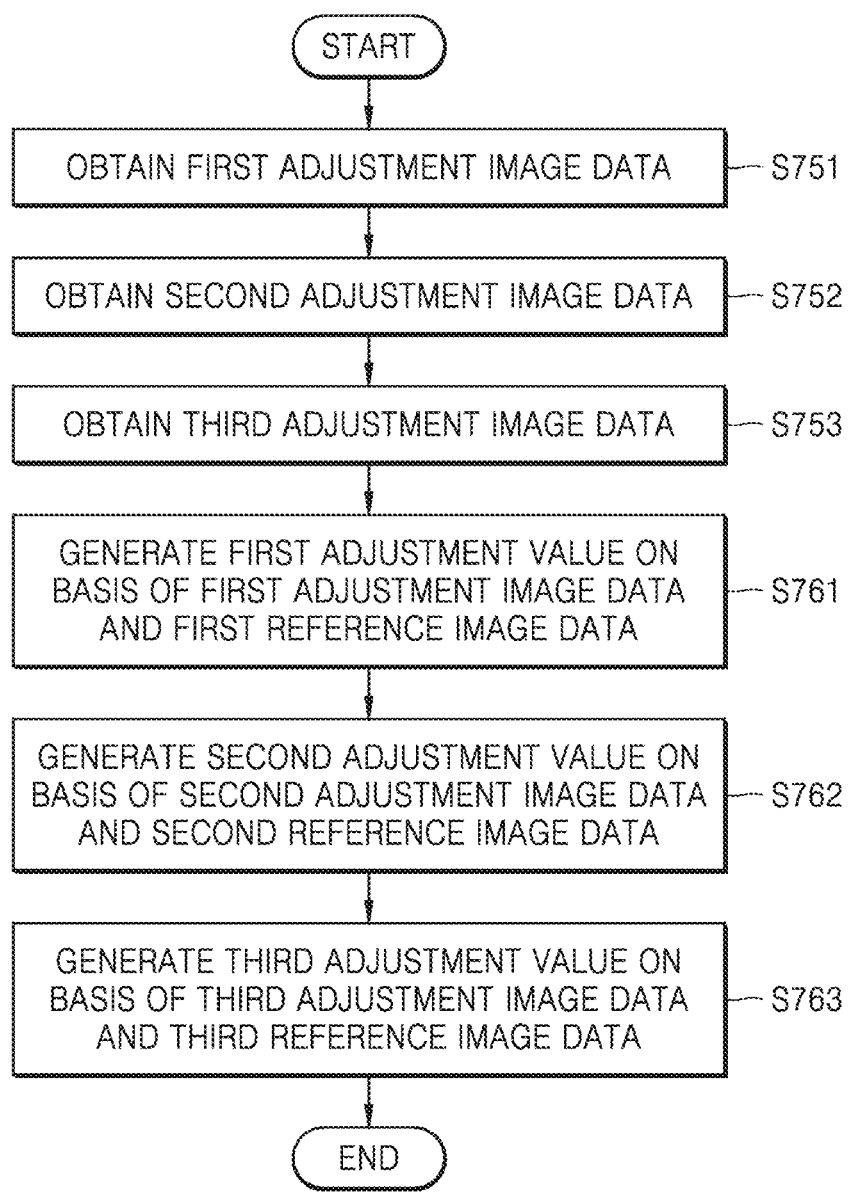
FIG. 7 is a flowchart for describing operation S750 and operation S760 illustrated in FIG. 6.

FIG. 7 is a flowchart for describing operation S750 and operation S760 illustrated in FIG. 6.

Referring to FIG. 7, operation S751, operation S752, and operation S753 may be included in operation S750 of FIG. 6, and operation S761, operation S762, and operation S763 may be included in operation S760 of FIG. 6.

In operation S751, the processor may obtain first adjustment image data. The first adjustment image data may correspond to a first adjustment image displayed by using red subpixels of the flexible display panel on the basis of the sample image data.

In operation S752, the processor may obtain second adjustment image data. The second adjustment image data may correspond to a second adjustment image displayed by using green subpixels of the flexible display panel on the basis of the sample image data.

In operation S753, the processor may obtain third adjustment image data. The third adjustment image data may correspond to a third adjustment image displayed by using blue subpixels of the flexible display panel on the basis of the sample image data. In FIG. 7, operation S751, operation S752, and operation S753 are illustrated in order, but are not limited thereto and the order of operation S751, operation S752, and operation S753 may be changed according to embodiments.

In operation S761, the processor may generate a first adjustment value on the basis of the first adjustment image data and first reference image data.

In operation S762, the processor may generate a second adjustment value on the basis of the second adjustment image data and second reference image data.

In operation S763, the processor may generate a third adjustment value on the basis of the third adjustment image data and third reference image data. In FIG. 7, it is illustrated that operations S761 to S763 are performed after operations S751 to S753, but at least some example embodiments of the inventive concepts are not limited thereto and may be modified according to embodiments. For example, the processor may perform operation S761 after performing operation S751, perform operation S762 after performing operation S752, and perform operation S763 after performing operation S753.

Figure 8:
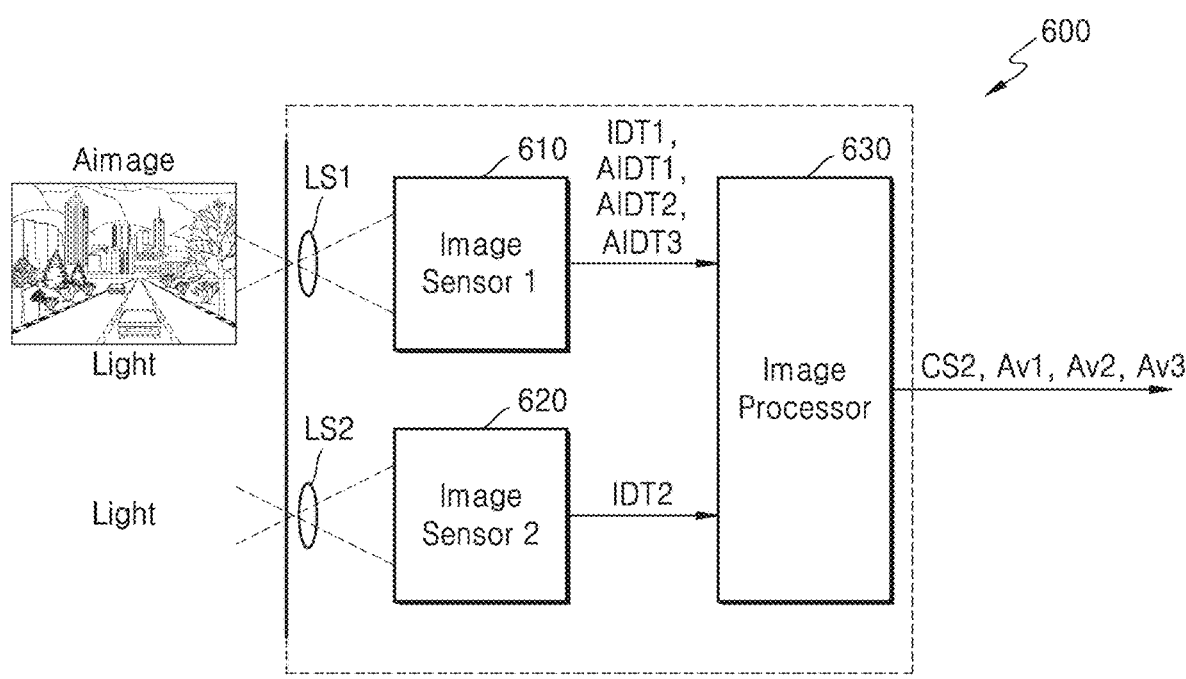
FIG. 8 is a diagram illustrating an image processing system according to at least one example embodiment of the inventive concepts.

FIG. 8 is a diagram illustrating an image processing system 600 according to at least one example embodiment of the inventive concepts.

Referring to FIG. 8, the image processing system 600 may include a first image sensor 610, a second image sensor 620, an image processor 630, a first lens LS1, and a second lens LS2. Operations of the first image sensor 610, the second image sensor 620, and the image processor 630 of the image processing system 600 of FIG. 8 may be similar to operations of the first image sensor 320, the second image sensor 330, and the image processor 310 of FIG. 3. Therefore, repeated descriptions are omitted. According to at least some example embodiments of the inventive concepts, the first image sensor 610, the second image sensor 620, and the image processor 630 of FIG. 8 are examples of the first image sensor 320, the second image sensor 330, and the processor 310 of FIG. 3. According to at least one example embodiment of the inventive concepts, the image processing system 600 may further general-use elements other than the elements illustrated in FIG. 8.

The first image sensor 610 may sense light and an adjustment image Aimage through the first lens LS1. The adjustment image Aimage may be displayed on the flexible display panel. The first image sensor 610 may sense light to generate first image data IDT1. The first image sensor 610 may sense the adjustment image Aimage to generate first adjustment image data AIDT1, second adjustment image data AIDT2, and third adjustment image data AIDT3.

The second image sensor 620 may sense light through the second lens LS2. The second image sensor 620 may sense light to generate second image data IDT2.

The image processor 630 may output a first control signal CS1 for performing a calibration operation of the flexible display panel on the basis of the first image data IDT1 and the second image data IDT2.

The image processor 630 may compare the first adjustment image data AIDT1 with first reference image data and may generate a first adjustment value Av1 corresponding to a comparison result. The image processor 630 may compare the second adjustment image data AIDT2 with second reference image data and may generate a second adjustment value Av2 corresponding to a comparison result. The image processor 630 may compare the third adjustment image data AIDT3 with third reference image data and may generate a third adjustment value Av3 corresponding to a comparison result.

The image processor 630 may generate a second control signal CS2 on the basis of the first adjustment value Av1, the second adjustment value Av2, and the third adjustment value Av3. The image processing system according to at least one example embodiment of the inventive concepts may control the flexible display panel so that a display calibration operation is automatically performed.

Figure 9:
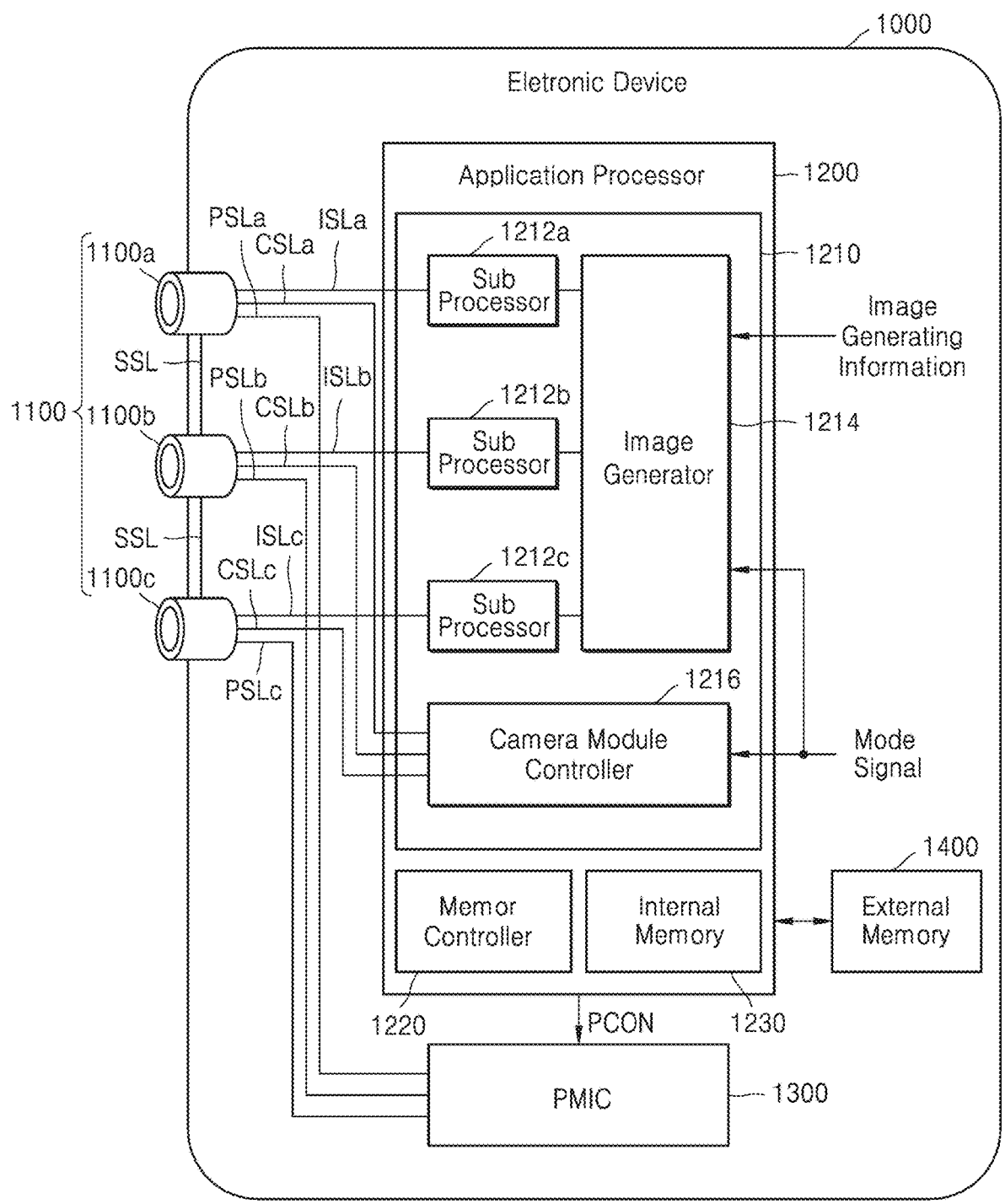
FIG. 9 is a block diagram of an electronic device including a multi-camera module.
Figure 10:
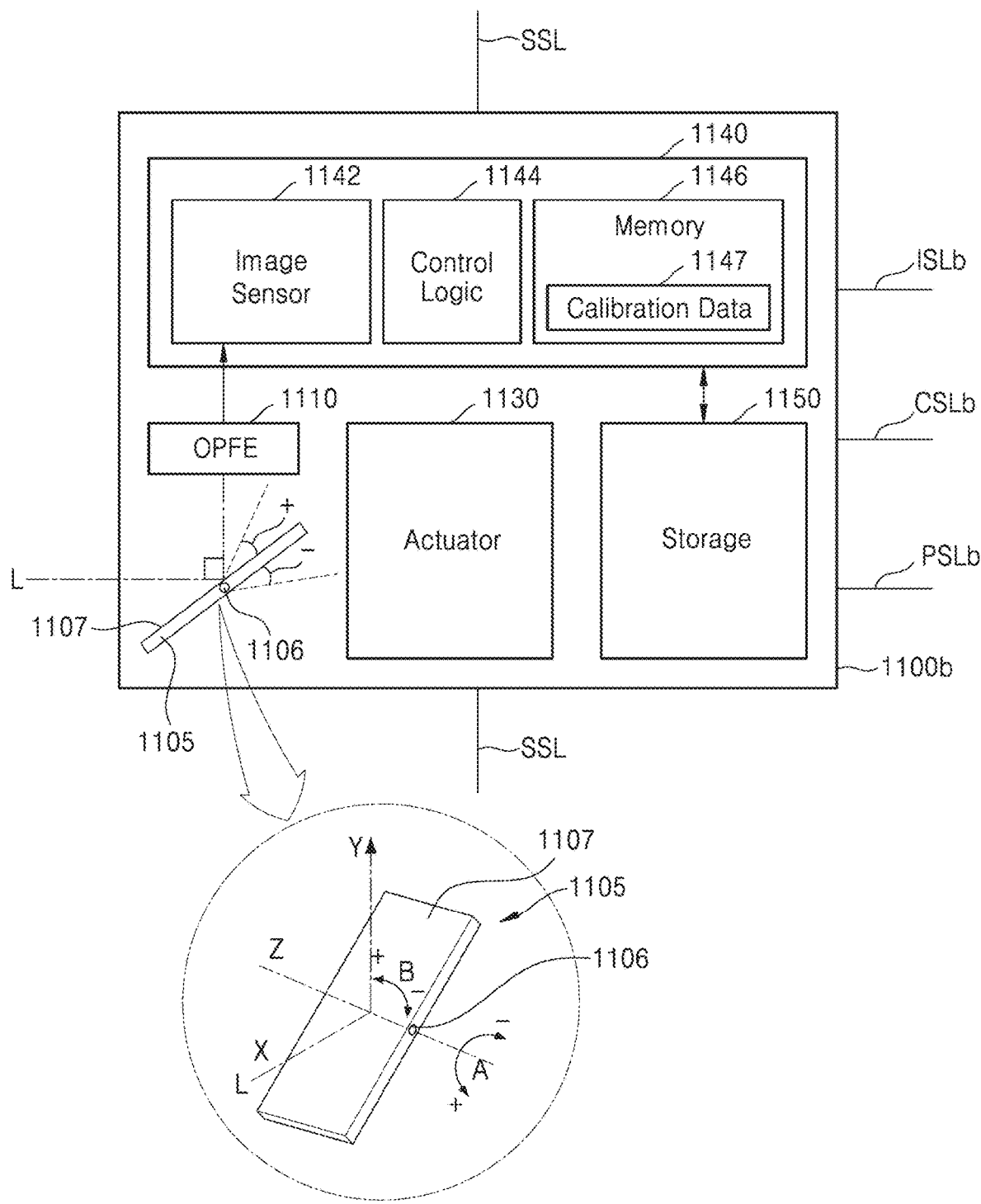
FIG. 10 is a detailed block diagram of a camera module of FIG. 9.

FIG. 9 is a block diagram of an electronic device 1000 including a multi camera module. FIG. 10 is a detailed block diagram of a camera module of FIG. 9. According to at least some example embodiments, the electronic device 1000 of is an example of the electronic device 100 of FIG. 1.

Referring to FIG. 9, the electronic device 1000 may include a camera module group 1100, an application processor 1200, a power management integrated circuit (PMIC) 1300, and an external memory 1400. The electronic device 1000 may include the electronic device according to at least one example embodiment of the inventive concepts.

The camera module group 1100 may include a plurality of camera modules 1100a to 1100c. Although an embodiment where three camera modules 1100a to 1100c are provided is illustrated in the drawing, but embodiments are not limited thereto. In some embodiments, the camera module group 1100 may be modified and implemented to include only two camera modules. Also, in some embodiments, the camera module group 1100 may be modified and implemented to include n (where n is a natural number of 4 or more) number of camera modules.

Hereinafter, a detailed configuration of the camera module 1100b will be described in more detail with reference to FIG. 10. According to at least some example embodiments, the configurations of the other camera modules 1100a and 1100c may be the same as or, alternatively, similar to, that of the camera module 1100b.

Referring to FIG. 10, the camera module 1100b may include a prism 1105, an optical path folding element (hereinafter referred to as an OPFE) 1110, an actuator 1130, an image sensing device 1140, and a storage 1150.

The prism 1105 may include a reflection surface 1107 of a light reflecting material and may change a path of light L incident from the outside.

In some embodiments, the prism 1105 may change a path of the light L, which is incident in a first direction X, to a second direction Y vertical to the first direction X. Also, the prism 1105 may rotate the reflection surface 1107 of the light reflecting material in an A direction with respect to a center shaft 1106, or may rotate the center shaft 1106 in a B direction to change the path of the light L, which is incident in the first direction X, to the second direction Y vertical to the first direction X. In this case, the OPFE 1110 may also move in a third direction Z vertical to the first direction X and the second direction Y.

In some embodiments, as illustrated, an A-direction maximum rotation angle of the prism 1105 may be, for example, 15 degrees or less in a (+) A direction and may be greater than 15 degrees in a (−) A direction, but embodiments are not limited thereto.

In some embodiments, the prism 1105 may move at about 20 degrees in a (+) B direction or a (−) B direction, or may move between 10 degrees and 20 degrees, or may move between 15 degrees and 20 degrees. Here, in a moving angle of the prism 1105, the prism 1105 may move at the same angle in the (+) or (−) B direction, or may move at a similar angle within a range of about 1 degree.

In some embodiments, the prism 1105 may move the center shaft 1106 of the light reflecting material in the third direction (for example, a Z direction) parallel to an extension direction of the center shaft 1106.

The OPFE 1110 may include, for example, an optical lens including m (where m is a natural number) number of groups. The m lenses may move in the second direction Y to change an optical zoom ratio of the camera module 1100*b*. For example, in a case where a basic optical zoom ratio of the camera module 1100*b* is Z, when m number of optical lenses included in the OPFE 1110 move, an optical zoom ratio of the camera module 1100*b* may be changed to an optical zoom ratio of 3Z, 5Z, or more.

The actuator 1130 may move the OPFE 1110 or the optical lens (hereinafter referred to as an optical lens) to a certain position. For example, the actuator 1130 may adjust a position of the optical lens so that the image sensor 1142 is disposed at a focal length of the optical lens, for accurate sensing.

The image sensing device 1140 may include an image sensor 1142, a control logic 1144, and a memory 1146. The image sensor 1142 may sense an image of a sensing target by using the light L provided through the optical lens. The control logic 1144 may control an overall operation of the camera module 1100*b*. For example, the control logic 1144 may control an operation of the camera module 1100*b* on the basis of a control signal provided through a control signal line CSLb. Each of the first image sensor and the second image sensor described above may correspond to the image sensor 1142.

The memory 1146 may store information, needed for an operation of the camera module 1100*b*, such as calibration data 1147. The calibration data 1147 may include information needed for a case where the camera module 1100*b* generates image data by using the light L provided from the outside. The calibration data 1147 may include, for example, information about the degree of rotation, information about a focal length, and information about an optical axis, described above. In a case where the camera module 1100*b* is implemented as a multi-state camera type where a focal length varies based on a position of an optical lens, the calibration data 1147 may include a focal length value for each position (or each state) of the optical lens and information associated with auto focusing.

The storage 1150 may store image data sensed through the image sensor 1142. The storage 1150 may be disposed outside the image sensing device 1140 and may be implemented as a stacked type with respect to a sensor chip configuring the image sensing device 1140. In some embodiments, the storage 1150 may be implemented with electrically erasable programmable read-only memory (EEPROM), but embodiments are not limited thereto.

Referring to FIG. 10 in conjunction with FIG. 9, in some embodiments, each of the plurality of camera modules 1100*a* to 1100*c* may include the actuator 1130. Therefore, each of the plurality of camera modules 1100*a* to 1100*c* may include the same or different pieces of calibration data 1147 based on an operation of the actuator 1130 included therein.

In some embodiments, one camera module (for example, 1100*b*) of the plurality of camera modules 1100*a* to 1100*c* may be a folded lens type camera module including the prism 1105 and the OPFE 1110 described above and the other camera modules (for example, 1100*a* and 1100*c*) may each be a vertical type camera module which does not include the prism 1105 and the OPFE 1110, but embodiments are not limited thereto.

In some embodiments, one camera module (for example, 1100*c*) of the plurality of camera modules 1100*a* to 1100*c* may be, for example, a vertical type depth camera which extracts depth information by using infrared ray (IR). In this case, the processor 1200 may merge image data, provided from the depth camera, with image data provided from the other camera module (for example, 1100*a* or 1100*b*) to generate a three-dimensional (3D) depth image.

In some embodiments, at least two camera modules (for example, 1100*a* and 1100*b*) of the plurality of camera modules 1100*a* to 1100*c* may have different fields of view. In this case, optical lenses of at least two camera modules (for example, 1100*a* and 1100*b*) of the plurality of camera modules 1100*a* to 1100*c* may differ each other, but embodiments are not limited thereto.

Also, in some embodiments, fields of view of the plurality of camera modules 1100*a* to 1100*c* may differ each other. In this case, optical lenses respectively included in the plurality of camera modules 1100*a* to 1100*c* may differ each other, but embodiments are not limited thereto.

In some embodiments each of the plurality of camera modules 1100*a* to 1100*c* may be disposed physically apart from one another. That is, instead of that the plurality of camera modules 1100*a* to 1100*c* do not divide and use a sensing region of one image sensor 1142, an independent image sensor 1142 may be disposed in each of the plurality of camera modules 1100*a* to 1100*c*.

Referring again to FIG. 9, the application processor 1200 may include an image processing device 1210, a memory controller 1220, and an internal memory 1230. The application processor 1200 may be implemented independently from the plurality of camera modules 1100*a* to 1100*c*. For example, the application processor 1200 and the plurality of camera modules 1100*a* to 1100*c* may be implemented as separate semiconductor chips independently from one another. The application processor 1200 may include the processor according to at least one example embodiment of the inventive concepts.

The image processing device 1210 may include a plurality of sub image processors 1212*a* to 1212*c*, an image generator 1214, and a camera module controller 1216.

The image processing device 1210 may include a number of sub image processors 1212*a* to 1212*c* corresponding to the number of camera modules 1100*a* to 1100*c*.

Image data generated from each of the plurality of camera modules 1100*a* to 1100*c* may be provided to the corresponding sub image processors 1212*a* to 1212*c* through image signal lines ISLa to ISLc which are apart from one another. For example, the image data generated from the camera module 1100*a* may be provided to the sub image processor 1212*a* through the image signal line ISLa, the image data generated from the camera module 1100*b* may be provided to the sub image processor 1212*b* through the image signal line ISLb, and the image data generated from the camera module 1100*c* may be provided to the sub image processor 1212*c* through the image signal line ISLc. Such image data transfer may be performed, for example, by using a camera serial interface (CSI) based on a mobile industry processor interface (MIPI), but embodiments are not limited thereto.

In some embodiments, one sub image processor may be disposed to correspond to a plurality of camera modules. For example, the sub image processor 1212a and the sub image processor 1212c may not be implemented apart from each other like illustration but may be integrated and implemented into one sub image processor, and image data provided from the camera module 1100a and the camera module 1100c may be selected through a selection element (for example, a multiplexer) and may be provided to an integrated sub image processor.

Image data provided to each of the sub image processors 1212a to 1212c may be provided to the image generator 1214. The image generator 1214 may merge image data by using image data provided from each of the sub image processors 1212a to 1212c on the basis of image generating information or a mode signal.

In some embodiments, the image generating information may include a zoom signal or a zoom factor. Also, in some embodiments, the mode signal may be, for example, a signal based on a mode selected by a user.

The image generating information may be the zoom signal (the zoom factor), and when the camera modules 1100a to 1100c have different fields of view each other, the image generator 1214 may perform different operations on the basis of the type of zoom signal. For example, when the zoom signal is a first signal, the image generator 1214 may merge image data, output from the camera module 1100a, with image data output from the camera module 1100c, and then, may generate an output image by using a merged image signal and image data output from the camera module 1100b which is not used in mergence. For example, when the zoom signal is a second signal which differs from the first signal, the image generator 1214 may not perform image data mergence and may generate output image data by selecting one of image data from among of image data output from each of the camera modules 1100a to 1100c. However, embodiments are not limited thereto, and depending on the case, a method of processing image data may be modified and implemented.

In some embodiments, the image generator 1214 may receive a plurality of image data, where exposure times differ, from at least one of the plurality of sub image processors 1212a to 1212c and may perform high dynamic range (HDR) processing on the plurality of image data, thereby generating merged image data where an HDR has increased.

The camera module controller 1216 may provide a control signal to each of the plurality of camera modules 1100a to 1100c. The control signal generated by the camera module controller 1216 may be provided to the corresponding camera modules of the plurality of 1100a to 1100c through control signal lines CSLa, CSLb, and CSLc which are apart from one another.

One of the plurality of camera modules 1100a to 1100c may be designated as a master camera (for example, 1100b) on the basis of the mode signal or the image generating information including the zoom signal, and the other camera modules (for example, 1100a and 1100c) may each be designated as a slave camera. Such information may be added to the control signal and may be provided to a corresponding camera module of the plurality of camera modules 1100a to 1100c through the control signal lines CSLa, CSLb, and CSLc which are apart from one another.

A camera module operating as a master and a slave may be changed based on a zoom factor or an operation mode signal. For example, when a field of view of the camera module 1100a is wider than a field of view of the camera module 1100b and the zoom factor represents a low zoom ratio, the camera module 1100b may operate as a master and the camera module 1100a may operate as a slave. On the other hand, when the zoom factor represents a high zoom ratio, the camera module 1100a may operate as a master and the camera module 1100b may operate as a slave.

In some embodiments, the control signal provided from the camera module controller 1216 to each of the camera modules 1100a to 1100c may include a sync enable signal. For example, when the camera module 1100b is a master camera and each of the camera modules 1100a and 1100c is a slave camera, the camera module controller 1216 may transfer the sync enable signal to the camera module 1100b. The camera module 1100b provided with the sync enable signal may generate a sync signal on the basis of the provided sync enable signal and may provide the generated sync signal to the camera modules 1100a and 1100c through a sync signal line SSL. The camera module 1100b and the camera modules 1100a and 1100c may transfer image data to the application processor 1200 in synchronization with the sync signal.

In some embodiments, the control signal provided from the camera module controller 1216 to each of the camera modules 1100a to 1100c may include mode information based on the mode signal. Based on the mode information, the plurality of camera modules 1100a to 1100c may operate in a first operation mode and a second operation mode in association with a sensing speed.

In the first operation mode, the plurality of camera modules 1100a to 1100c may generate an image signal (for example, generate an image signal having a first frame rate) at a first speed, encode the generated image signal (for example, encode an image signal having a second frame rate which is higher than the first frame rate) at a second speed which is higher than the first speed, and transfer an encoded image signal to the processor 1200. In this case, the second speed may be less than or equal to 30 times the first speed.

The application processor 1200 may store the received image signal (i.e., the encoded image signal) in the internal memory 1230 included therein or the external memory 1400 of the application processor 1200, and then, may read and decode the encoded image signal from the internal memory 1230 or the external memory 1400 and may display image data generated based on a decoded image signal.

In the second operation mode, the plurality of camera modules 1100a to 1100c may generate an image signal (for example, generate an image signal having a third frame rate which is lower than the first frame rate) at a third speed which is lower than the first speed and may transfer the image signal to the application processor 1200. The image signal provided to the application processor 1200 may be a signal which is not encoded. The application processor 1200 may perform image processing on the received image signal, or may store the image signal in the internal memory 1230 or the external memory 1400.

The PMIC 1300 may supply power (for example, a source voltage) to each of the plurality of camera modules 1100a to 1100c. For example, based on control by the application processor 1200, the PMIC 1300 may supply first power to the camera module 1100a through a power signal line PSLa, supply second power to the camera module 1100b through a power signal line PSLb, and supply third power to the camera module 1100c through a power signal line PSLc.

The PMIC 1300 may generate power corresponding to each of the plurality of camera modules 1100a to 1100c in response to a power control signal PCON from the application processor 1200 and may adjust a level of the power. The power control signal PCON may include a power adjustment signal for each operation mode of each of the plurality of camera modules 1100*a* to 1100*c*. For example, the operation mode may include a low power mode, and in this case, the power control signal PCON may include information about a set power level and a camera module which operates in the low power mode. Levels of powers respectively provided to the plurality of camera modules 1100*a* to 1100*c* may be the same or differ each other. Also, a level of power may be dynamically changed. Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An electronic device comprising:
   a display device including a flexible display panel;
   a first image sensor configured to, when the flexible display panel is bent, sense an image displayed on the flexible display panel and generate adjustment image data of the image;
   a second image sensor configured to sense external light; and
   a processor configured to:
      generate, based on the adjustment image data and reference image data, an adjustment value for setting the flexible display panel,
      receive first image data less than or equal to a set value from the first image sensor for a first period of time,
      generate a first control signal when second image data less than or equal to a set value is received from the second image sensor for a second period of time, and
      transfer the first control signal and sample image data, which is to be displayed on the flexible display panel, to the display device.

2. The electronic device of claim 1, wherein,
   the flexible display panel is disposed on a first surface of the electronic device,
   the first image sensor is disposed on the first surface of the electronic device, and
   the second image sensor is disposed on a second surface, which is opposite to the first surface, of the electronic device.

3. The electronic device of claim 1, wherein the processor is further configured to,
   perform a calibration operation of the flexible display panel based on image data received from each of the first image sensor and the second image sensor.

4. The electronic device of claim 3,
   wherein the flexible display panel includes a plurality of subpixels, and
   wherein the flexible display panel is configured to display an adjustment image corresponding to each of subpixels having a same color among the plurality of subpixels based on of the first control signal and the sample image data.

5. The electronic device of claim 4,
   wherein the plurality of subpixels includes red subpixels, green subpixels, and blue subpixels, and
   wherein the flexible display panel is configured to, based on the first control signal and the sample image data, display a first adjustment image by using the red subpixels,
   display a second adjustment image by using the green subpixels, and
   display a third adjustment image by using the blue subpixels.

6. The electronic device of claim 5, wherein the adjustment image data includes first adjustment image data, second adjustment image data, and third adjustment image data respectively corresponding to the first adjustment image, the second adjustment image, and the third adjustment image.

7. The electronic device of claim 6, wherein the processor is further configured to,
   compare the first adjustment image data with first reference image data and generate a first adjustment value,
   compare the second adjustment image data with second reference image data and generate a second adjustment value, and
   compare the third adjustment image data with third reference image data and generate a third adjustment value.

8. The electronic device of claim 7, wherein the processor is further configured to transfer, to the display device, a second control signal for adjusting a color of the flexible display panel based on the first adjustment value, the second adjustment value, and the third adjustment value.

9. The electronic device of claim 8, wherein the processor is further configured to calculate an adjustment ratio of the flexible display panel based on the first adjustment value, the second adjustment value, and the third adjustment value and to re-generate the first control signal based on the adjustment ratio.

10. The electronic device of claim 1, wherein the processor is further configured to convert adjustment image data generated from the first image sensor by using at least one of a color temperature having a first value and luminance having a second value and to generate conversion image data.

11. The electronic device of claim 1, further comprising:
    a timer configured to measure a time after a first control signal is generated,
    wherein the processor is further configured to, when a time measured by the timer is equal to a first period of time, re-generate the first control signal.

12. An image processing system comprising:
    a first image sensor configured to,
    sense an image displayed on a flexible display panel, and generate adjustment image data of the image;
    a second image sensor configured to sense external light; and
    an image processor configured to,
    output a first control signal for performing a calibration operation of the flexible display panel based on light sensed by each of the first image sensor and the second image sensor,
    generate an adjustment value for setting the flexible display panel based on the adjustment image data and reference image data,
    generate the first control signal when first image data less than or equal to a set value is received from the first image sensor during a first period of time and second image data less than or equal to a set value is received from the second image sensor for a second period of time, and
    output the first control signal and sample image data which is to be displayed on the flexible display panel.

13. The image processing system of claim 12,
wherein the adjustment image data includes first adjustment image data, second adjustment image data, and third adjustment image data, and
wherein the first adjustment image data corresponds to a first adjustment image displayed by using red subpixels of the flexible display panel based on the sample image data, the second adjustment image data corresponds to a second adjustment image displayed by using green subpixels of the flexible display panel based on the sample image data, and the third adjustment image data corresponds to a third adjustment image displayed by using blue subpixels of the flexible display panel based on the sample image data.

14. The image processing system of claim 13, wherein the image processor is further configured to,
compare the first adjustment image data with first reference image data and generate a first adjustment value,
compare the second adjustment image data with second reference image data and generate a second adjustment value, and
compare the third adjustment image data with third reference image data and generate a third adjustment value.

15. The image processing system of claim 14, wherein the image processor is further configured to transfer, to a display device in which the flexible display panel is included, a second control signal for adjusting a color of the flexible display panel based on the first adjustment value, the second adjustment value, and the third adjustment value.

16. An operating method of an electronic device, the operating method comprising:
determining whether first image data less than or equal to a set value is received from a first image sensor during a first period of time;
determining whether second image data less than or equal to a set value is received from a second image sensor during a second period of time;
generating a first control signal based on whether the first image data is received and the second image data is received;
transferring the first control signal and sample image data to a flexible display panel;
obtaining, based on the first control signal and the sample image data, adjustment image data corresponding to an adjustment image displayed by the flexible display panel; and
generating, based on the adjustment image data and reference adjustment data, an adjustment value for setting the flexible display panel.

17. The operating method of claim 16, wherein the obtaining of the adjustment image data comprises:
obtaining, from the first image sensor, first adjustment image data, corresponding to a first adjustment image displayed by using red subpixels of the flexible display panel;
obtaining, from the first image sensor, second adjustment image data corresponding to a second adjustment image displayed by using green subpixels of the flexible display panel; and
obtaining, from the first image sensor, third adjustment image data, corresponding to a third adjustment image displayed by using blue subpixels of the flexible display panel.

18. The operating method of claim 17, wherein the generating of the adjustment value comprises:
comparing the first adjustment image data with first reference image data and generating a first adjustment value;
comparing the second adjustment image data with second reference image data and generating a second adjustment value; and
comparing the third adjustment image data with third reference image data and generating a third adjustment value.

* * * * *